(12) United States Patent  (10) Patent No.: US 7,410,200 B2
Kirschener  (45) Date of Patent: Aug. 12, 2008

(54) DEVICE FOR CONCEALING VEHICLE IDENTIFICATION NUMBERS

(76) Inventor: Jack Kirschener, 9107 Wilshire Blvd. #700, Beverly Hills, CA (US) 90210

( * ) Notice: Subject to any disclaimer, the term of this patent is extended or adjusted under 35 U.S.C. 154(b) by 2 days.

(21) Appl. No.: 11/747,731

(22) Filed: May 11, 2007

(65) Prior Publication Data

US 2007/0296239 A1    Dec. 27, 2007

Related U.S. Application Data

(60) Provisional application No. 60/800,219, filed on May 11, 2006.

(51) Int. Cl.
*B60J 7/00* (2006.01)
(52) U.S. Cl. ..................................... 296/97.7
(58) Field of Classification Search ................. 296/97.7
See application file for complete search history.

(56) References Cited

U.S. PATENT DOCUMENTS 4,449,747 A * 5/1984 Morgan et al. .............. 156/212
4,956,930 A   9/1990 Troncoso
6,079,137 A   6/2000 Mitchell
6,098,329 A   8/2000 Rowen et al.
6,594,926 B1  7/2003 Wujciga
7,114,759 B1* 10/2006 Chen et al. ................. 296/97.2
2002/0135197 A1* 9/2002 Howard ..................... 296/97.7
2004/0148826 A1  8/2004 MacNeil
2004/0159023 A1  8/2004 Degroote

* cited by examiner

*Primary Examiner*—Joseph D Pape
(74) *Attorney, Agent, or Firm*—Edwin P. Tarver; Patel & Alumit, PC

(57) ABSTRACT

A device for concealing the Vehicle Identification Number (VIN) plate/label. The label is typically disposed on the dashboard of the automobile, especially in a narrow space between the dashboard and the windshield of the automobile such that the label can be seen from the outside of the automobile through the front windshield. The device comprises a panel comprising a distal portion. The panel is to be placed over the label as the distal portion is securely wedged between the dashboard and windshield of the automobile.

14 Claims, 11 Drawing Sheets

DEVICE FOR CONCEALING VEHICLE IDENTIFICATION NUMBERS

CROSS-REFERENCE TO RELATED APPLICATION

This application claims the benefit of the filing date of provisional application No. 60/800,219 filed May 11, 2006.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to automobile accessories and more particularly to a device for concealing the Vehicle Identification Number (VIN) label of an automobile; the label typically located on the dashboard of the automobile.

Several covering and concealing devices for use with vehicles are known in the art. U.S. Pat. No. 6,594,926 to Wujciga discloses a decorative and durable vehicle license plate cover that is flat, thick, mar-resistant plate of optically transparent stable, such as acrylic plastic. The plate has a solid body with a front surface, a rear surface and sides interconnecting the two surfaces. Spaced holes are drilled on the perimeter of the front surface and extend to the rear surface for attaching the cover to a vehicle license plate.

U.S. Pat. No. 6,079,137 to Mitchell discloses protective repository for a tag having first and second portions connected by a flexible portion or live hinge. The first portion defines a cavity having an inwardly facing sidewall and a bottom wall and conforming to the shape of the tag. The second portion defines a raised area having an outwardly facing sidewall and a top wall. The outwardly facing sidewall is shaped to fit matingly the inwardly facing sidewall surface so that the top wall is adjacent to the bottom wall thereby retaining the tag.

U.S. Pub. No. 20040159023 to DeGroote discloses a license plate loover for preventing unauthorized photographing of the license plates. The loover structure uses solid non see-through slats that are horizontally across. The slats are similar to mini blinds. These slats can not be seen through from above or from an abrupt angle and are made of a solid material but allow a clear view from straight on Bolts are used to install the loover on the license plate.

The above devices are not designed for concealing the VIN present on the dashboard of automobile. So far there are no devices in the art that are exclusively designed to conceal the VIN present on the dashboard of an automobile.

It is therefore an object of the present invention to provide a device for concealing the VIN of an automobile so as to prevent any illegal and fraudulent use. A further object is to provide a device for concealing the VIN that can be used with all types of automobiles. Other objects of the present invention will become better understood with reference to the appended Summary, Description, and Claims.

SUMMARY

The present invention is a device for concealing the Vehicle Identification Number (VIN) label of an automobile; the label typically attached on the dashboard of an automobile such that is can be seen from outside of the automobile through its front windshield. The device comprises a panel, which in turn comprises oppositely located proximal and distal portions. The proximal portion serves as a means for gripping and handling the panel while distal portion is to be wedged between the windshield and the dashboard as the panel substantially covers over the label on the dashboard. The distal portion is wedged such that the panel is held firmly in place. The thickness of the distal portion can be increased so as to make the device adaptable for various automobiles.

FIGURES—REFERENCE NUMERALS

10 . . . Device for Concealing VIN Label
12 . . . VIN Label
14 . . . Dashboard
16 . . . Automobile
18 . . . Front Windshield
20 . . . Flat Panel
22 . . . Proximal Edge
24 . . . Distal Edge
26 . . . Side Edge
28 . . . Top Side
30 . . . Bottom Side
32 . . . Impressed Line
34 . . . Gripping Ledge
36 . . . Additional Wedging Member

DETAILED DESCRIPTION

Figure 1:
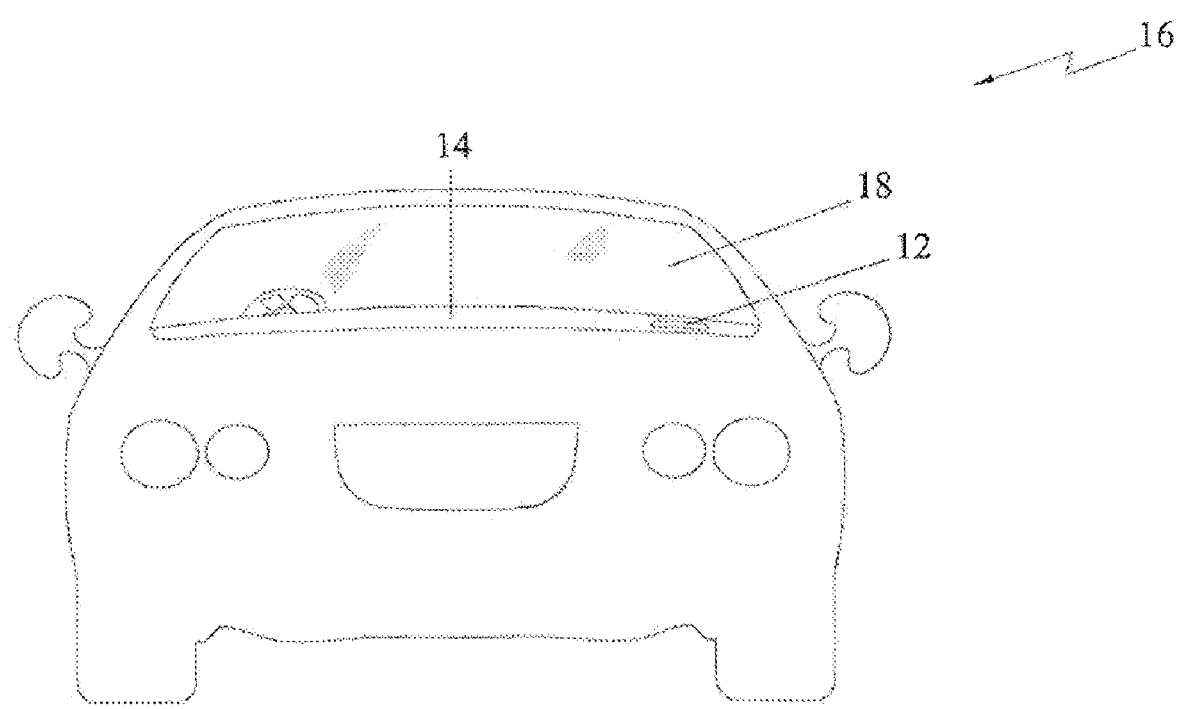
FIG. 1 is a front view of an automobile with its VIN label visible through the front windshield.
Figure 2:
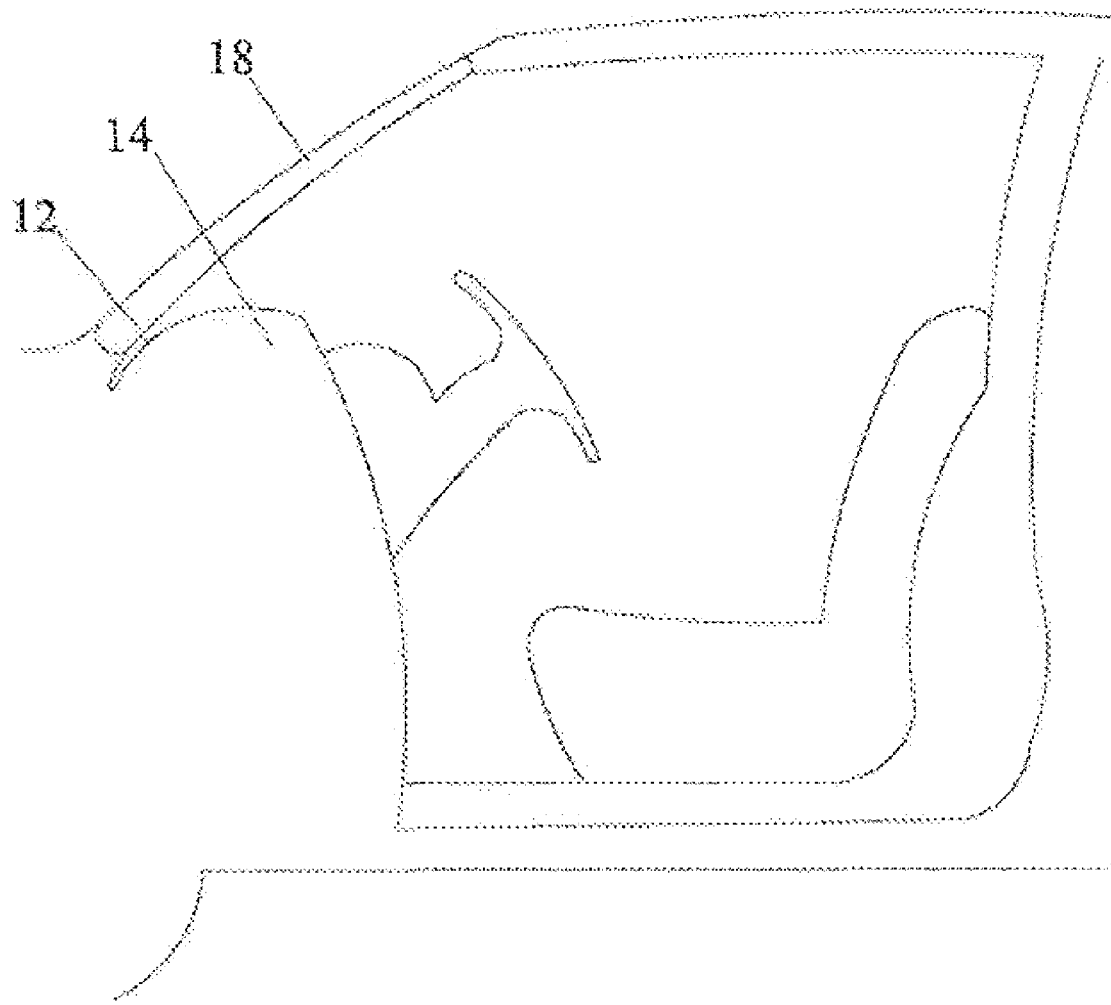
FIG. 2 is a side view of the dashboard and the windshield; the VIN attached to the dashboard.

Referring to the drawings, a preferred embodiment of a device for concealing the Vehicle Identification Number (VIN) plate/label of an automobile is illustrated and generally indicated as 10 in FIGS. 1 through 11. Typically, the label 12 is placed on the dashboard 14 of the automobile 16, especially in the narrow space between the dashboard 14 and the front windshield 18 of the automobile 16. The label 12 can be seen from the outside of the automobile 16 through the front windshield 18 as seen in FIGS. 1 and 2. The device 10 is preferably made of a soft and flexible plastic material, and more particularly made of flexible black molded plastic in extruded form.

Figure 3:
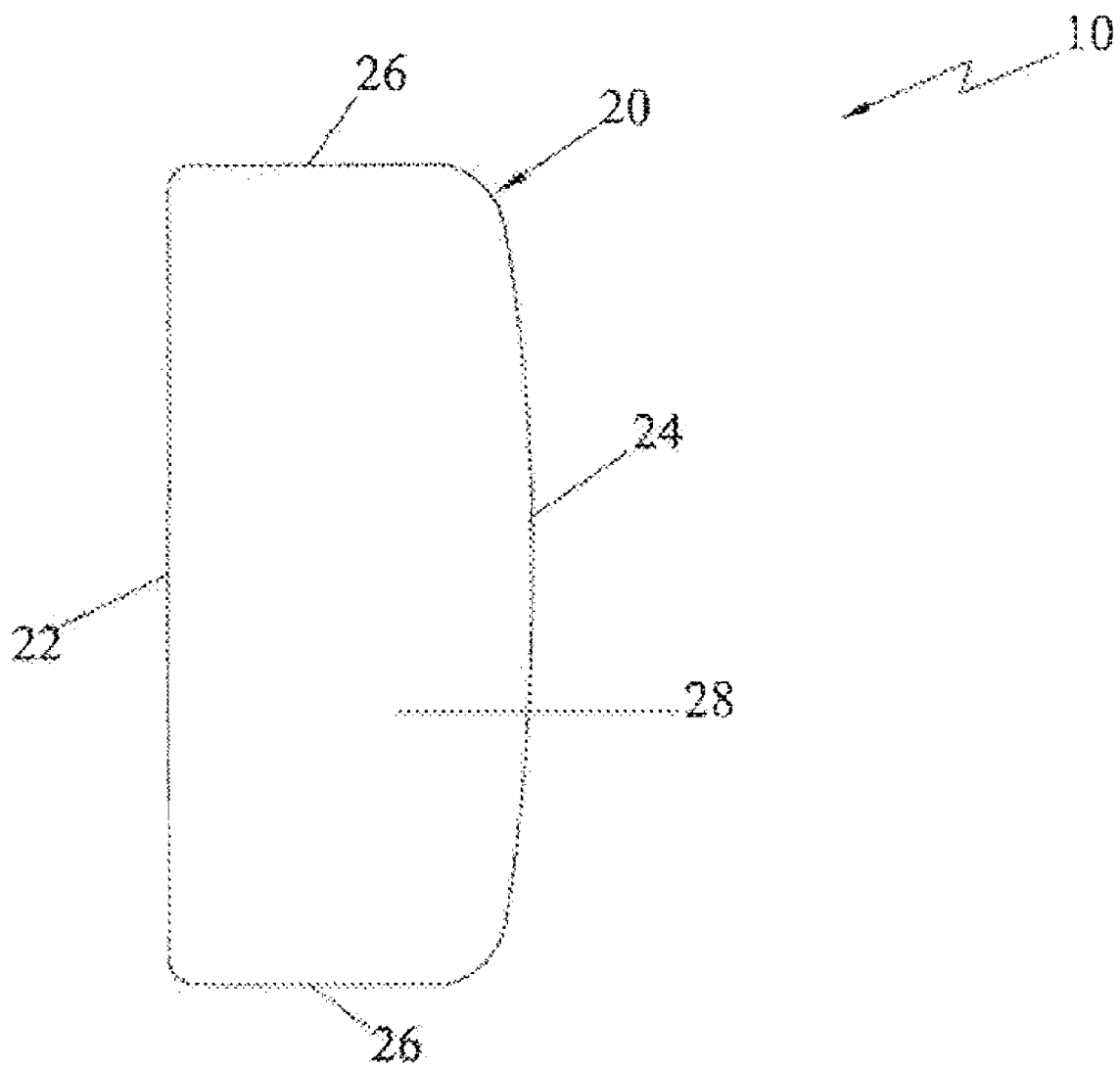
FIG. 3 is a plan view of the top side of the panel in accordance with the present invention.
Figure 4:
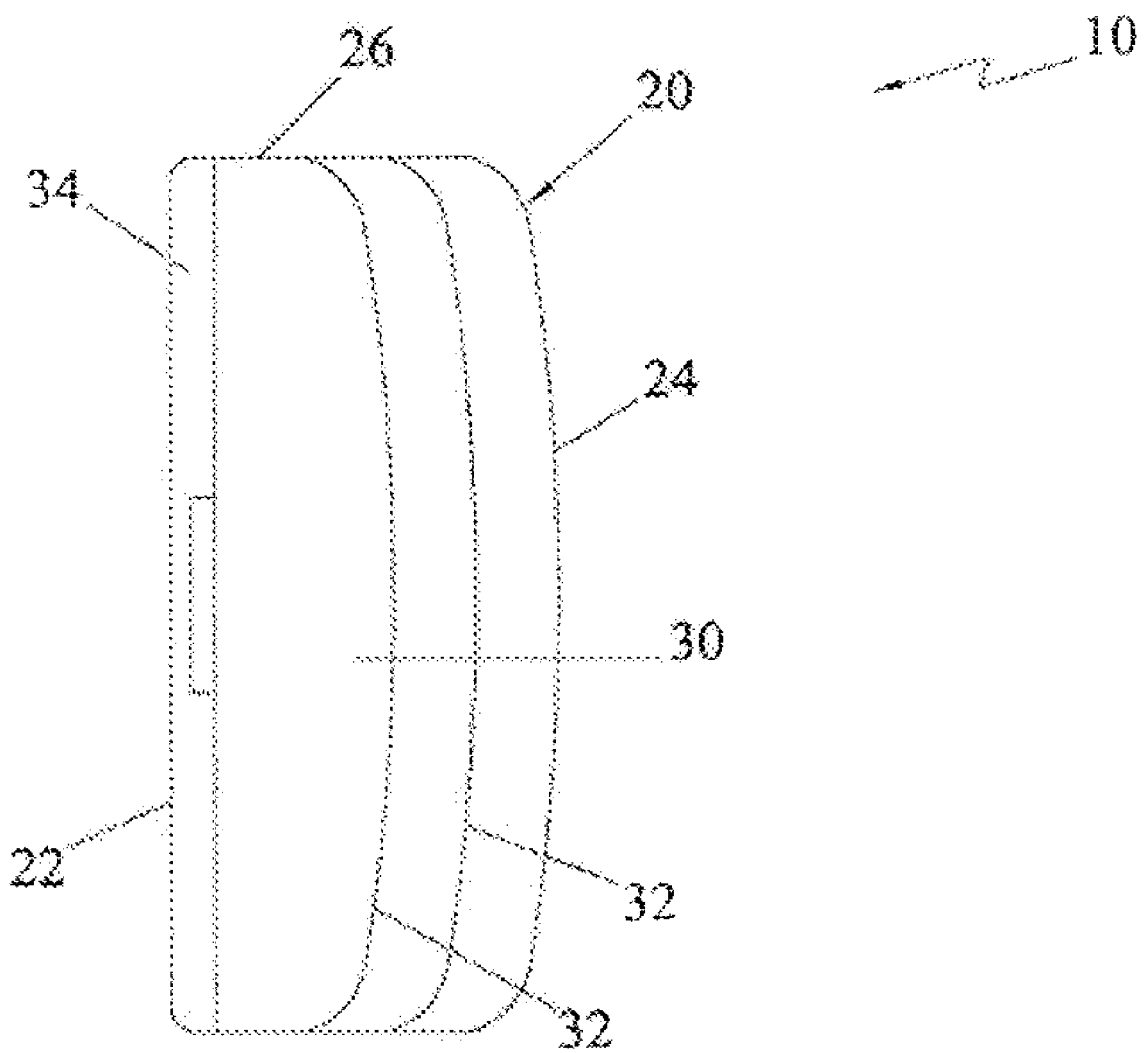
FIG. 4 is a plan view of the bottom side of the panel in accordance with the present invention.
Figure 5:
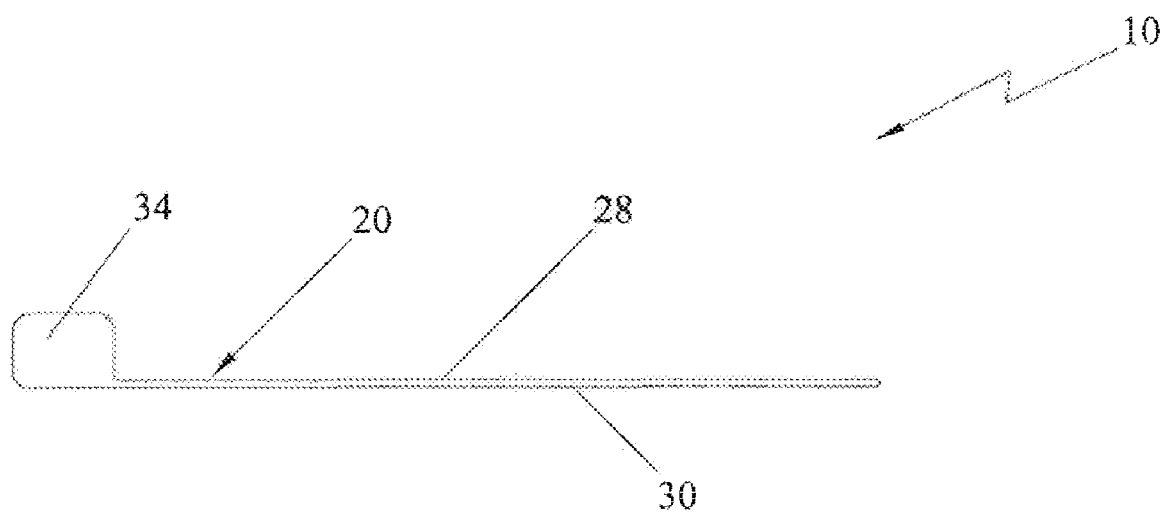
FIG. 5 is a side view of the panel in accordance with the present invention.

Referring to FIGS. 3 through 5, the device 10 comprises a flat panel 20 which in turn comprises proximal and distal portions located opposite to each other. The panel 20 can be defined by proximal and distal edges 22 & 24, and a pair of parallel side edges 26 connecting the proximal and distal edges which are oppositely located. The panel 20 further includes top and bottom sides 28 & 30 as it is flat. The corners formed at the junctions combining the distal edge 24 and the side edges 26 are substantially rounded as seen in FIGS. 3 and 4.

Still referring to FIGS. 3 through 5, the panel 20 further comprises a plurality of parallel impressed lines 32 disposed on the distal portion such that each impressed line 32 is parallel to distal edge 24. The panel 20 can be folded about the impressed lines 32 so as to increase the thickness of the distal portion. The distal portion is slightly tapered towards the distal edge 24 as seen in FIG. 5.

Figure 6:
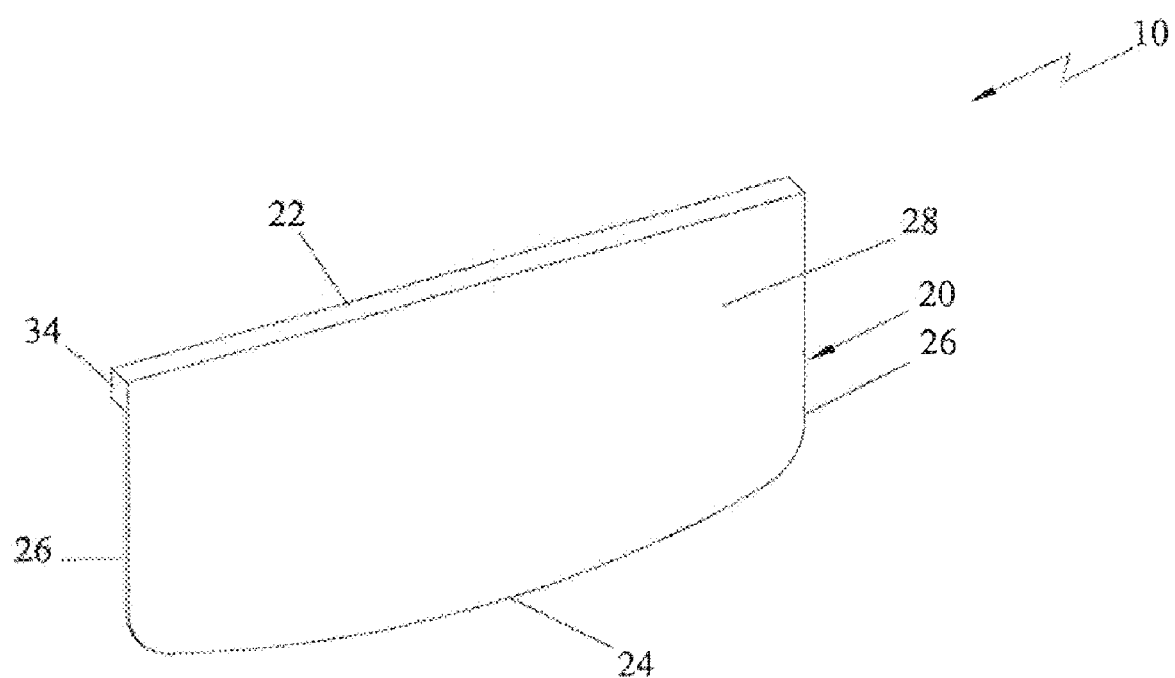
FIG. 6 is a perspective view of the panel in accordance with the present invention.
Figure 7:
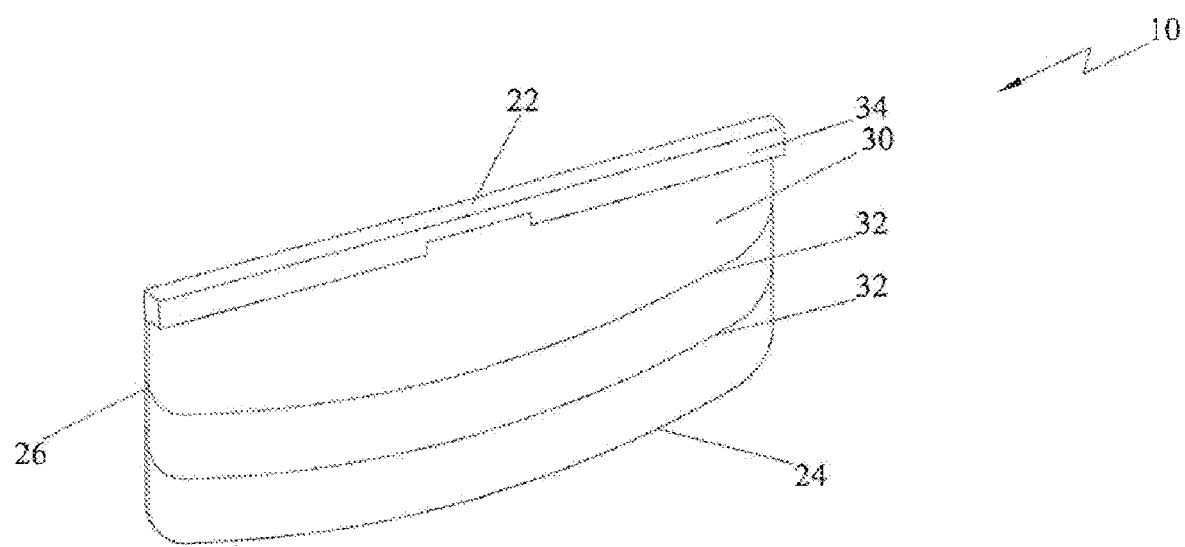
FIG. 7 is another perspective view of the panel in accordance with the present invention.
Figure 8:
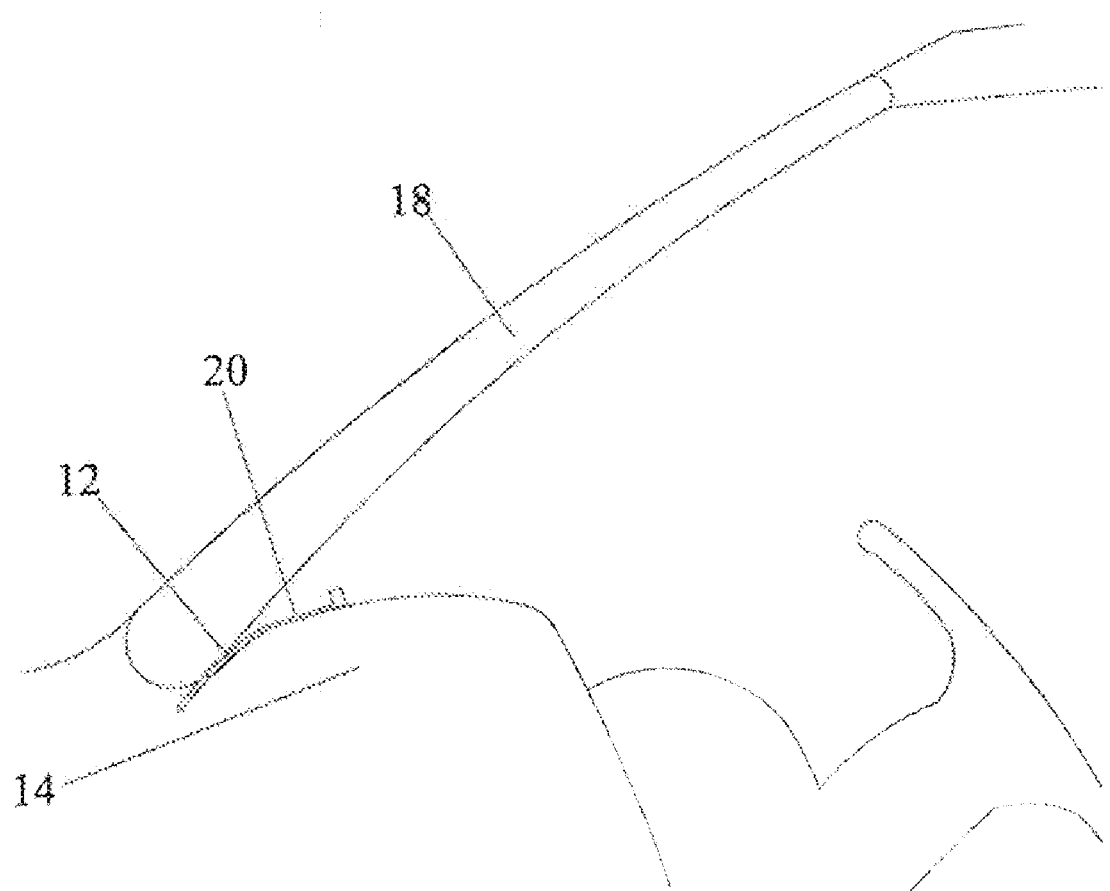
FIG. 8 is a side view of the panel wedged between the windshield and the dashboard in accordance with the present invention.

Referring to FIGS. 5 through 7, the proximal section comprises a gripping ledge 34 perpendicularly extending from the proximal edge 22 of the panel 20. More particularly, the ledge 34 extends form the bottom side 30 of the panel 20 as seen in the referred figures. The panel 20 is to be gripped and handled about the ledge 34. The ledge 34 is of a uniform rectangular cross-section.

Figure 9:
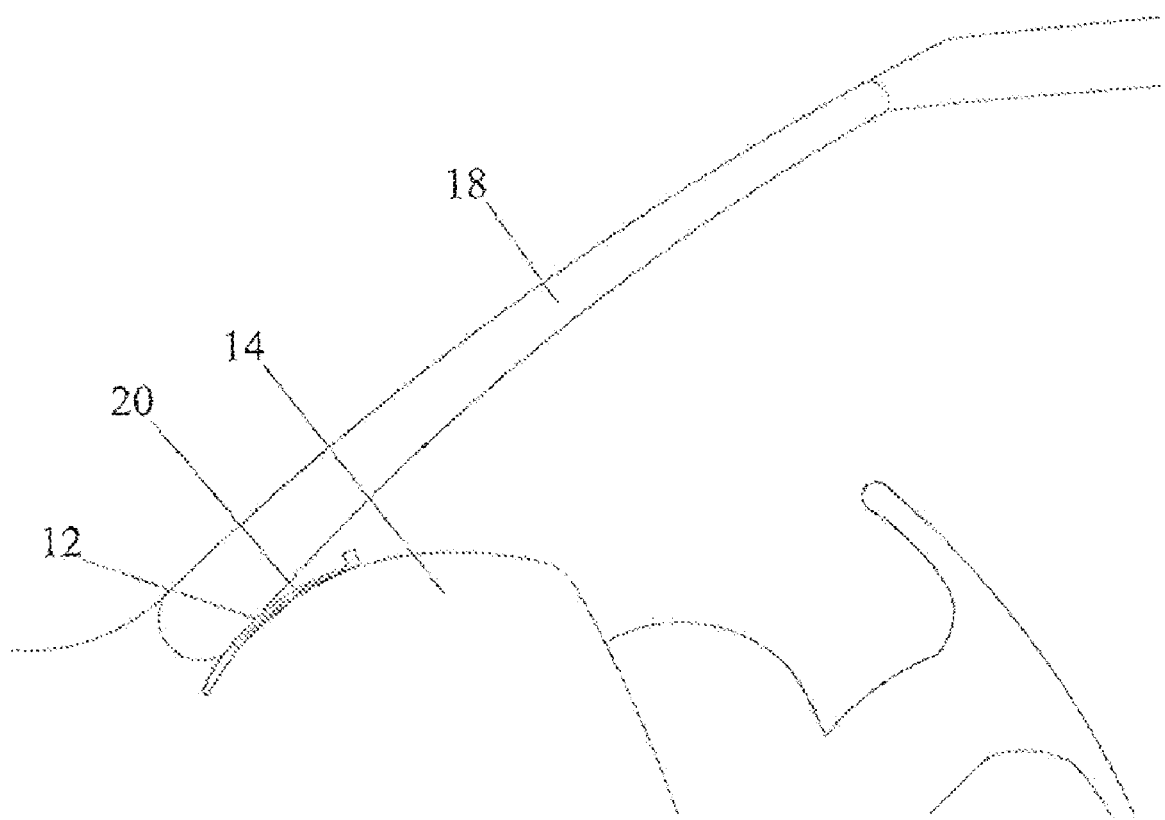
FIG. 9 is a side view of the folded panel wedged between the windshield and the dashboard in accordance with the present invention.
Figure 10:
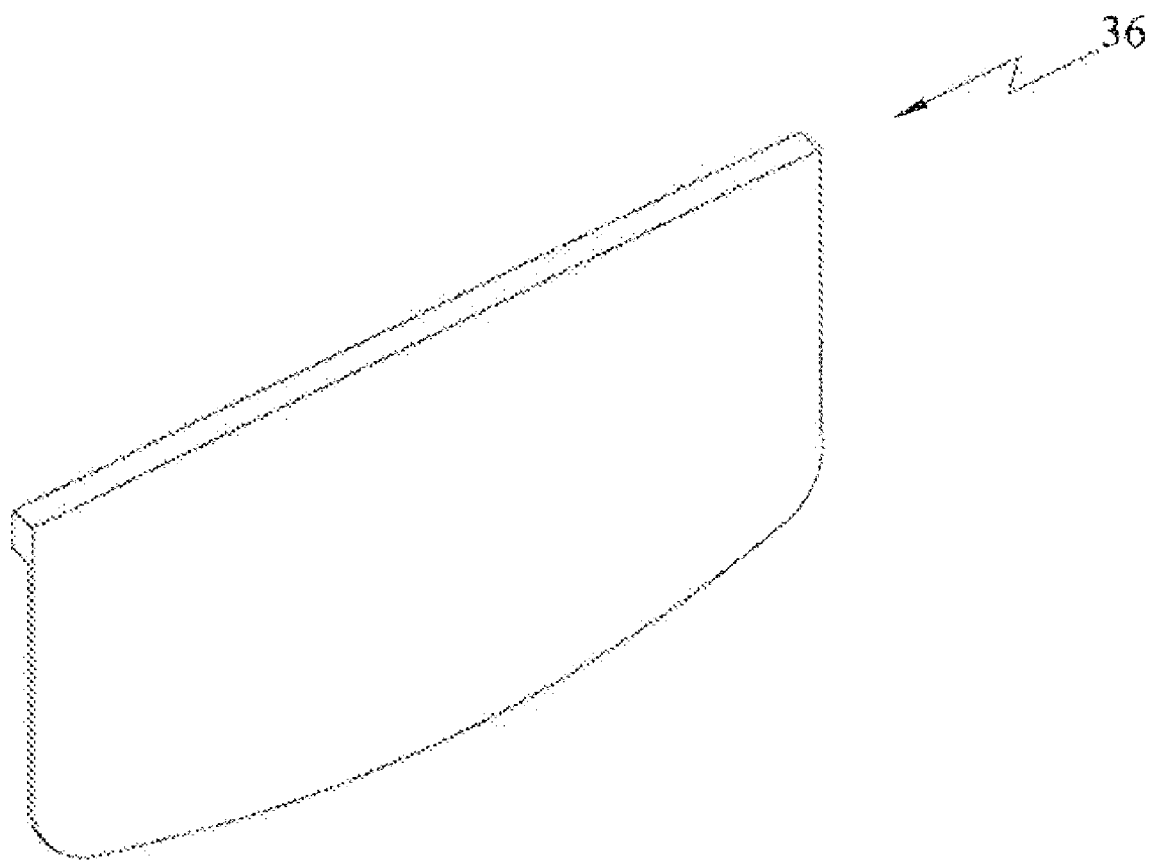
FIG. 10 is a perspective view of the additional wedging member in accordance with the present invention.
Figure 11:
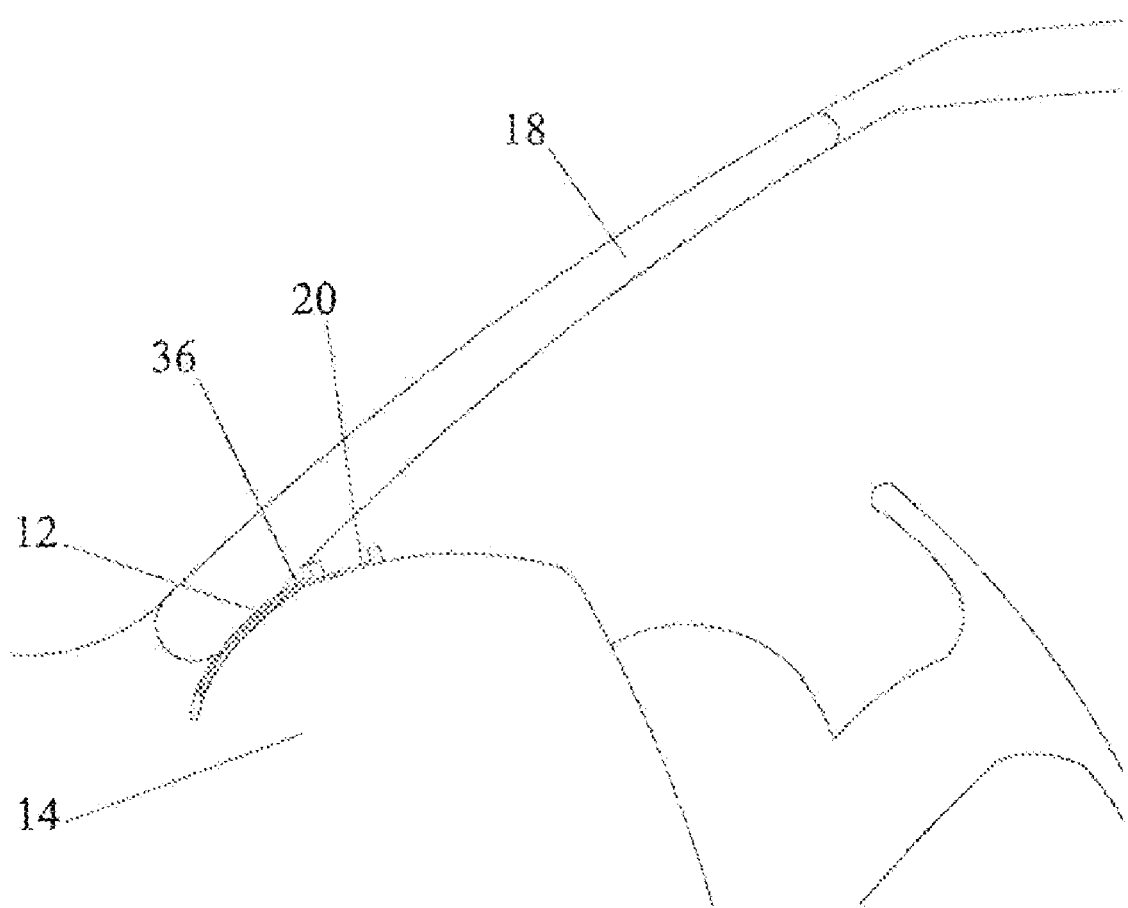
FIG. 11 is a side view of the panel and the additional wedging member wedged between the windshield and the dashboard in accordance with the present invention.

Referring to FIGS. 8 through 11, in order to make use of the device 10, the distal portion is wedged into the narrow space between the dashboard 14 and the windshield 18 of the automobile 16 such that the label 12 is concealed. The distal portion is to be wedged such that the panel 20 is held firmly in place. However, if the thickness of the distal portion is insufficient for producing the secured wedging effect, the panel 20 can be folded about the impressed lines 32 so as to increase the thickness of the distal portion as seen in FIG. 9. Alternatively, an additional wedging member 36 can be wedged between the panel 20 and windshield 18 so as to secure the panel 20 firmly in place as seen in FIG. 11. It is preferable that the bottom side 30 of the panel 20 abuts the dashboard 14. The panel 20 can be easily removed by pulling the ledge 34 away from the windshield 18.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A device for concealing the Vehicle Identification Number (VIN) plate/label of an automobile in the narrow space between the dashboard and the windshield of an automobile, the device comprising a panel, comprising a distal portion, tightly wedged between the dashboard and windshield of the automobile, a proximal portion with a handling means; and a series of impressed lines arrayed across one surface of the panel, allowing the panel to bend along the arc of the dashboard.

2. The device of claim 1, wherein the series of parallel impressed lines disposed across the surface of the panel at the distal portion such that each line is parallel to the distal edge of the panel; allows the panel to be folded about the impressed lines so as to increase the thickness of the panel.

3. The device of claim 1, wherein the handling means comprises a gripping ledge perpendicularly extending from one side of the panel; the panel to be gripped and handled about the ledge.

4. The device of claim 3, wherein the distal portion abuts the dashboard and the windshield when installed.

5. The device of claim 3, wherein the ledge is of rectangular in configuration.

6. The device of claim 3, wherein the ledge is of uniform rectangular cross-section.

7. The device of claim 1, wherein the device is made of a soft flexible material.

8. The device of claim 7, wherein the device is made of a soft flexible plastic material.

9. The device of claim 8, wherein the device is made of flexible black molded plastic in extruded form.

10. The device of claim 1, wherein the panel is opaque.

11. The device of claim 1, wherein the panel is substantially rectangular on plan except for the extremities of the distal edge of the panel, which are substantially rounded.

12. The device of claim 1, wherein the distal portion is tapered outwards.

13. The device of claim 1, wherein the device is provided with an additional wedge member which is to wedged between the panel and windshield in order to make up for the slack therebetween.

14. The device of claim 13, wherein the additional member can be wedged between the panel and the dashboard in order to make up for the slack therebetween.

* * * * *

UNITED STATES PATENT AND TRADEMARK OFFICE
CERTIFICATE OF CORRECTION

| | | |
|---|---|---|
| PATENT NO. | : 7,410,200 B2 | Page 1 of 1 |
| APPLICATION NO. | : 11/747731 | |
| DATED | : August 12, 2008 | |
| INVENTOR(S) | : Jack Kirschner | |

It is certified that error appears in the above-identified patent and that said Letters Patent is hereby corrected as shown below:

Title Page items 12 and 76 –

Please correct the spelling of Mr. Kirschner's last name on his patent Certificate. His last name is misspelled and should be change to KIRSCHNER.

Signed and Sealed this

Second Day of June, 2009

JOHN DOLL
*Acting Director of the United States Patent and Trademark Office*